US011664893B2

(12) United States Patent
Huang et al.

(10) Patent No.: US 11,664,893 B2
(45) Date of Patent: *May 30, 2023

(54) SUPPRESSED OUT-OF-BAND LEVEL FOR INCREASING LOSS MARGIN AND STABLE ABC OPERATION OF CODED DFOS SYSTEM

(71) Applicant: NEC Laboratories America, Inc., Princeton, NJ (US)

(72) Inventors: Yue-Kai Huang, Princeton, NJ (US); Junqiang Hu, Davis, CA (US)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,148

(22) Filed: Mar. 20, 2022

(65) Prior Publication Data

US 2022/0321214 A1    Oct. 6, 2022

Related U.S. Application Data

(63) Continuation of application No. 17/221,837, filed on Apr. 4, 2021, now Pat. No. 11,296,786.

(51) Int. Cl.
| | |
|---|---|
| H04B 10/07 | (2013.01) |
| H04B 10/079 | (2013.01) |
| H04B 10/294 | (2013.01) |
| H04B 10/69 | (2013.01) |
| G02B 6/02 | (2006.01) |
| G01M 11/00 | (2006.01) |
| H04B 10/071 | (2013.01) |
| H04J 14/02 | (2006.01) |

(52) U.S. Cl.
CPC ....... *H04B 10/07957* (2013.01); *G02B 6/022* (2013.01); *H04B 10/294* (2013.01); *H04B 10/6932* (2013.01); *G01M 11/3109* (2013.01); *H04B 10/07* (2013.01); *H04B 10/071* (2013.01); *H04J 14/02* (2013.01)

(58) Field of Classification Search
CPC ............ H04B 10/07957; H04B 10/294; H04B 10/6932; H04B 10/07; H04B 10/071; H04B 10/073; G02B 6/022; G01M 11/3109; H04J 14/02
USPC ......................................... 398/9–38, 43–103
See application file for complete search history.

(56) References Cited

U.S. PATENT DOCUMENTS

| | | | | |
|---|---|---|---|---|
| 6,271,942 B1* | 8/2001 | Sasai | ..................... | H04B 10/564 398/9 |
| 9,917,637 B1* | 3/2018 | Castro Do Amaral | ...................... | H04B 10/0775 |
| 2004/0096214 A1* | 5/2004 | Morreale | ........... | H04B 10/0775 398/33 |
| 2009/0027656 A1* | 1/2009 | Zhang | ................ | G01M 11/3118 356/73 |
| 2009/0238580 A1* | 9/2009 | Kikuchi | ............. | H04B 10/5055 398/192 |

(Continued)

*Primary Examiner* — Dibson J Sanchez
(74) *Attorney, Agent, or Firm* — Joseph Kolodka (57) ABSTRACT

Aspects of the present disclosure describe distributed fiber optic sensing (DFOS) systems, methods, and structures that advantageously overcome problems encountered when operating DFOS systems over operational telecommunications facilities namely, cross-phase modulation, and uneven amplitude profiles through the use of a novel constant amplitude coded DFOS employing suppressed out-of-band signaling.

2 Claims, 11 Drawing Sheets

(56) References Cited

U.S. PATENT DOCUMENTS

| | | | |
|---|---|---|---|
| 2011/0141459 A1* | 6/2011 | Onoda | G01D 5/35316 356/73.1 |
| 2011/0293282 A1* | 12/2011 | Jovanovich | H04B 10/2589 398/135 |
| 2016/0277101 A1* | 9/2016 | Jiang | G01M 11/3118 |
| 2017/0052041 A1* | 2/2017 | Cedilnik | G01M 11/3118 |
| 2017/0180042 A1* | 6/2017 | Luo | G01M 11/3145 |
| 2018/0058197 A1* | 3/2018 | Barfoot | E21B 47/00 |
| 2018/0205455 A1* | 7/2018 | Mattos | H04B 10/077 |
| 2019/0025094 A1* | 1/2019 | Lewis | G01D 5/35361 |
| 2021/0021365 A1* | 1/2021 | Hand | H04L 1/1607 |

\* cited by examiner

SUPPRESSED OUT-OF-BAND LEVEL FOR INCREASING LOSS MARGIN AND STABLE ABC OPERATION OF CODED DFOS SYSTEM

CROSS REFERENCE

This application claims the benefit of U.S. Provisional Patent Application Ser. No. 63/276,033 filed 5 Nov. 2021 and is a continuation in part of U.S. patent application Ser. No. 17/221,837 filed 4 Apr. 2021 which claimed the benefit of U.S. Provisional Patent Application Ser. No. 63/006,218 filed 7 Apr. 2020 the entire contents of each being incorporated by reference as if set forth at length herein.

TECHNICAL FIELD

This disclosure relates generally to distributed fiber optic sensing (DFOS) and telecommunications over a common optical fiber conveying both DFOS signals and telecommunications signals simultaneously.

BACKGROUND

A major impediment to integrating DFOS and telecommunications signals on a common optical fiber is nonlinear crosstalk that occurs between the two types of signals. Given the contemporary interest in such simultaneous operation of DFOS and telecommunications over a common optical fiber, —systems, methods, and structures that permit or otherwise improve such simultaneous operation would be a welcome addition to the art.

Previously, we disclosed a system and method in which constant amplitude coded DFOS is enabled by adding out-of-band (OOB) signal addition. The disclosure advantageously solved the problem of high XPM nonlinearity created by coded distributed fiber-optic sensing (DFOS) system which prohibit the integration of sensing and communication signals on the same fiber due to nonlinear cross-talks. Having constant amplitude coding sequence also has the benefit of equalized signal amplification through EDFA, this provides great convenience when implementing DAS hardware design.

Our scheme has since been implemented in a distributed acoustic sensor (DAS) arrangement. During testing, we identified a potential drawback of the scheme. As the majority of the power output from the constant amplitude DAS is actually made up of the OOB signal, it may take up most of the signal amplitude for the reflected sensing signal. (Roughly ~10× higher than the actual coded sequence when the duty cycle is 10%) When there exists a large OOB signal, an EDFA and photo-receiver at the DFOS receiver can become saturated, and the actual sensing signal may not receive sufficient gain or even be distorted. This will have a deteriorative effect on the sensing performance if there are multiple high reflection points in the DFOS link or if the DFOS link loss is very large. Even though it is possible to operate coded DFOS without OOB signal, but for certain applications an OOB signal is necessary because the low duty cycle nature of coded DFOS makes it very challenging to maintain stable modulator biasing automatically.

SUMMARY

An advance in the art is made according to aspects of the present disclosure directed to a coded DFOS system employing suppressed OOB modulation method in which the OOB amplitude is reduced as compared to the coded sequence, thereby mitigating the receiver saturation issue cause by high reflected power.

As will become apparent to those skilled in the art, with less saturation, the interrogated signal of the coded sequence can receive more gain at the receiver while the OOB signal is properly filtered out before a decoding operation of the in-band signal. By suppressing the OOB signal amplitude, automatic bias control (ABC) operation of the optical modulator can advantageously be stabilized. As ABC requires the detection of the applied bias dither signal, constant modulation input is necessary and is done via the suppressed OOB.

With suppressed OOB, the generated DFOS signal output no longer exhibits a constant amplitude property, thus the code sequence may exhibit a distorted gain profile due to erbium doped fiber amplifier (EDFA) dynamics. Equalized interrogation amplitude only for the coded sequence is applied using digital pre-equalization, such that a proper decoding of reflected signals—without spatial leakage—is maintained.

BRIEF DESCRIPTION OF THE DRAWING

A more complete understanding of the present disclosure may be realized by reference to the accompanying drawing in which:

FIG. 2(A) and FIG. 2(B) are a pair of plots showing.

FIG. 3(A) and FIG. 3(B) are a pair of plots showing: FIG. 2(A) a chirp coded sequence distorted by EDFA gain dynamics.

FIG. 4(A) and FIG. 4(B) are a pair of plots showing constant amplitude interrogation signal using out-of-band single frequency tone: wherein FIG. 4(A) is a temporal waveform; and FIG. 4(B) a frequency spectrum according to aspects of the present disclosure;

FIG. 5(A) and FIG. 5(B) are a pair of plots showing constant amplitude interrogation signal using chirped out-of-band signal: wherein FIG. 5(A) is a temporal waveform; and FIG. 5(B) a frequency spectrum according to aspects of the present disclosure;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ration (SNR) of Rayleigh-scattering based system (e.g. distributed acoustic sensing or DAS) and Brillouin-scattering based system (e.g. Brillouin optical time domain reflectometry or BOTDR).

As currently implemented in contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber.

One of the greatest challenges in integrating sensing and communication signals on the same fiber as noted previously is the nonlinear cross-talk that occurs between the sensing and communications signals. One reason is that the instantaneous operation power of the DFOS signals is much higher as compared to the communications signals (channels), thus degrading communications performance due to fiber nonlinearity. Implementing a signal coding in DFOS allows reduction of the instantaneous operation power in the interrogation signal, however, there still exists a large power fluctuation in the beginning and the falling edges of the code sequence—which in turn leads to cross phase modulation (XPM) distortion on neighboring wavelength division multiplexed (WDM) communication channels.

Yet another difficulty when applying a coding to a DFOS system is the signal amplification. As is known and understood, an erbium-doped fiber amplifier (EDFA) arguably remains the best medium for optical signal amplification and as a result they are widely used in communications fibers. With respect to a possible signal coding noted, as the length of a code sequence increases, however, it approaches the carrier recovery time of the erbium atoms. As a result, an amplified output signal will exhibit an uneven amplitude profile and the code sequence will experience a decreasing gain over the period of the whole sequence. If uncorrected, the uneven amplitude profile will affect the auto-correlation function of the implemented code and cause signal crosstalk between different fiber segments in the DFOS system.

Figure 1:
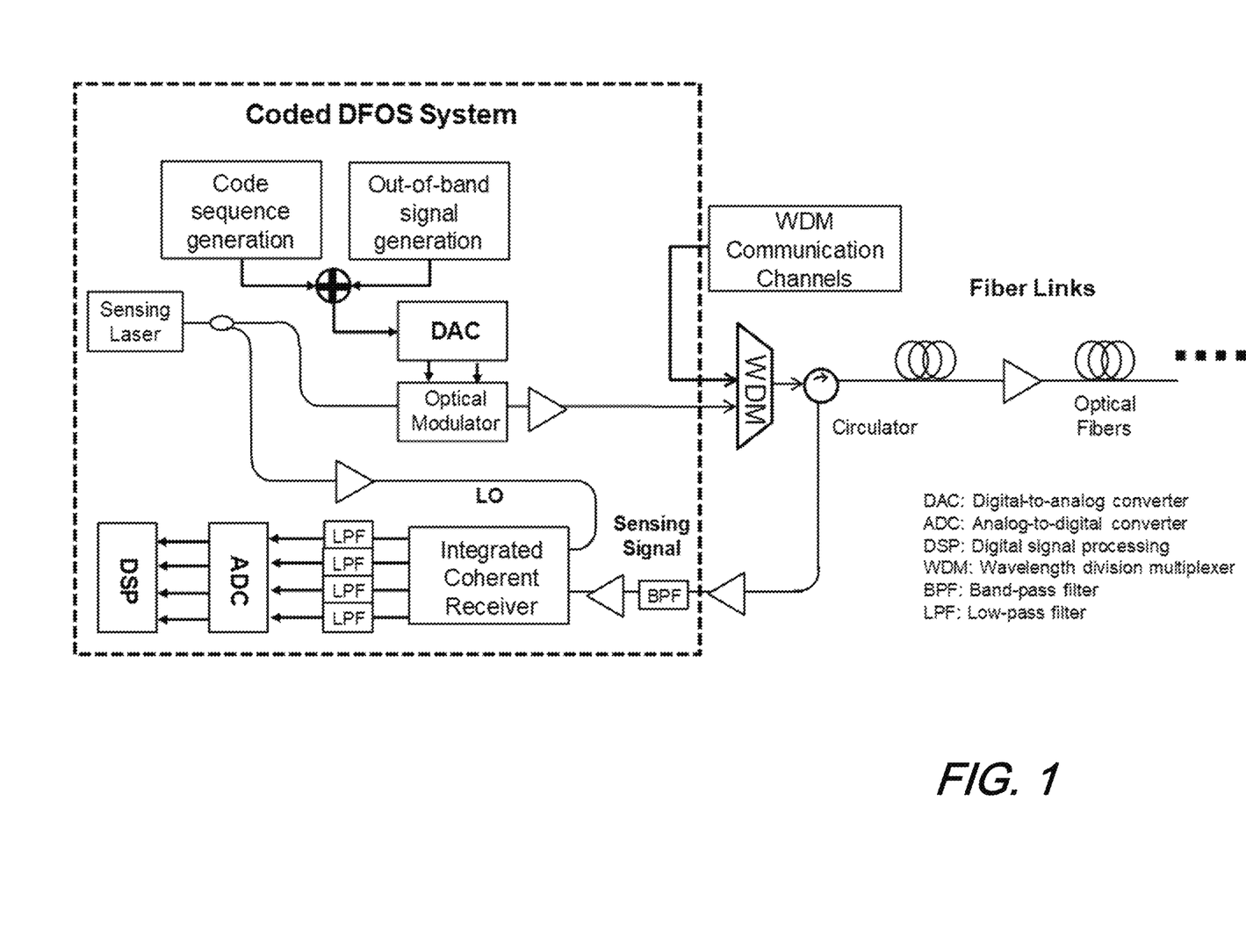
FIG. 1 is a schematic diagram illustrating a coded constant-amplitude DFOS system with out-of-band signal generation according to aspects of the present disclosure.

FIG. 1 is a schematic block diagram of a coded constant-amplitude DFOS system with out-of band signal generation according to aspects of the present disclosure. In the depicted block diagram, we illustratively show how out-of-band signal generation will be applied to the DFOS system according to aspects of the present disclosure.

Operationally, we assume that the DFOS system will be Rayleigh-scattering based system (e.g. distributed acoustic sensing or DAS) and Brillouin-scattering based system (e.g. Brillouin optical time domain reflectometry or BOTDR) with a coding implementation. With such coding designs, these systems will be most likely be integrated with fiber communication systems due to their lower power operation and will also be more affected by the optical amplifier response time.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS operation may also be integrated together with communication channels via WDM in the same fiber. Inside the sensing fiber, the interrogation sequence and the returned sensing signal may be optically amplified—either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and the changes in the response is then identified and interpreted for sensor readouts.

With continued reference to the figure, since the coded interrogation sequence is generated digitally, the out-of-band signal is also generated digitally, and then combined with the code sequence before waveforms are created by the DAC. When generated together digitally, the out-of-band signal will only be generated outside the time period of the code sequence, so when added together, the combined waveform will have a constant amplitude.

Note that it is also possible to generate the out-of-band signal separately using a different DAC or waveform generator and combine it with a code-sequence. In that illustrative scenario, any separate modules need to be synchronized so that their relative waveform start/end time match such that the combined waveform maintains a constant amplitude.

Advantageously, it is also possible to optically generate the out-of-band signal and combine it with the code sequence in the optical domain.

Note that during the transmission, interrogation, and reception of the DFOS signal, the signal will be amplified by one or multiple optical amplifiers. With extended code length, a signal will experience different gain in the different part of the code sequence due to the optical amplifier carrier recovery response, if the signal is not a constant amplitude across the interrogation frame. According to aspects of the present disclosure—with our innovation—the out-of-band signal combined with the code sequence will keep the overall signal amplitude constant, and therefore stabilize the gain response.

In the case where sensing signals share the same fiber as WDM communication channels, keeping the signals at a constant amplitude will advantageously result in a performance benefit as well. Fiber nonlinearity crosstalk due to XPM, which can be problematic during the rising and falling edges of code sequences, will be minimized according to our inventive techniques. More particularly, the combined sensing signal will remove the amplitude fluctuations exhibited in the original code sequence and therefore mitigate XPM crosstalk.

We note that the out-of-band signal has no actual contribution in the coding/decoding operation of the DFOS system. After reception of the sensing signal, it is removed from the coded signal before decoding by the DSP. The removal can be done by optical, electrical, or digital filters. Since the sensing signal likely exhibits a narrow band, so we assume an optical filter will not be used. As such, in the illustrative block diagram, we assume electrical filtering is used for cost and complexity purposes as lower sampling speed can be adopted for ADC after LPF.

Figure 2A:
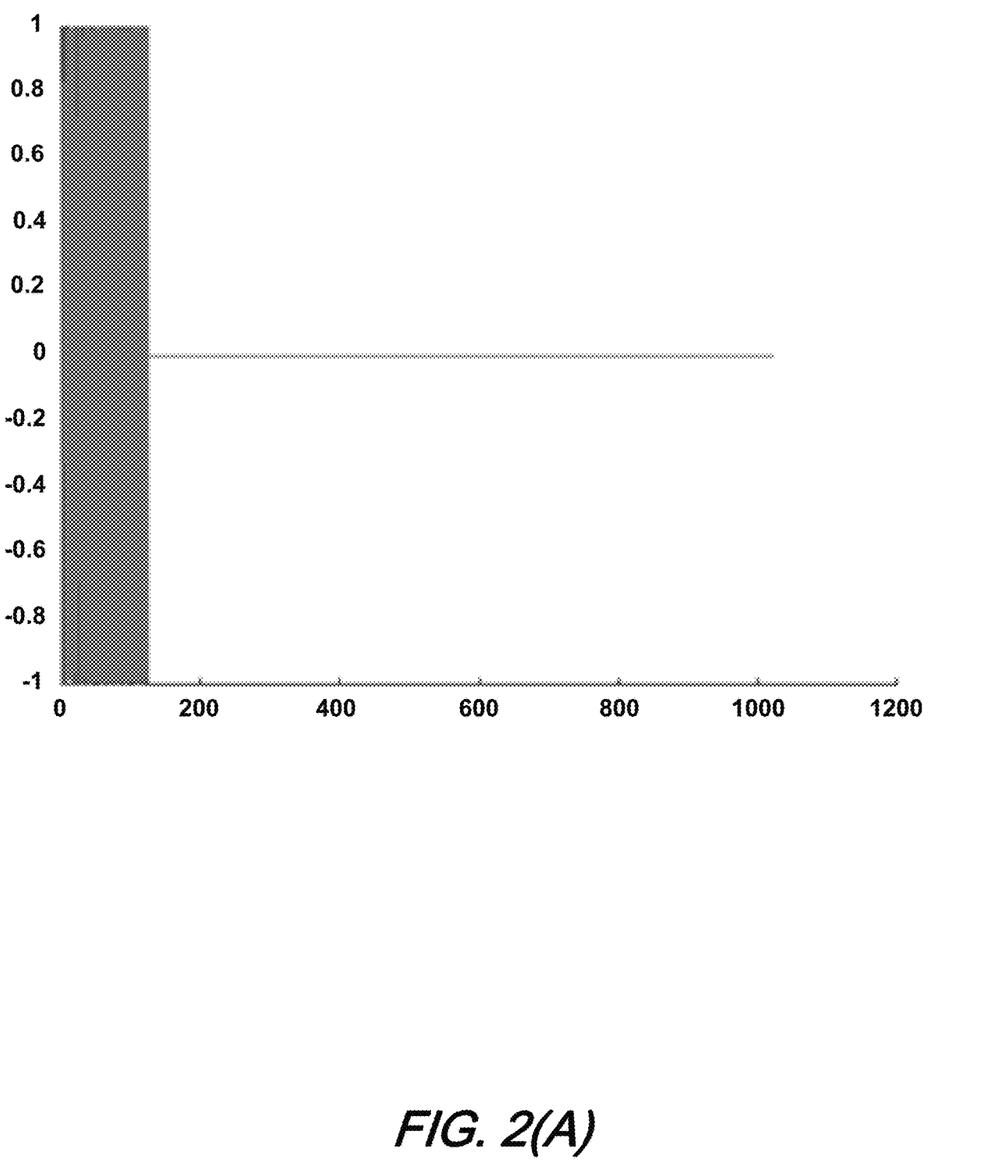
FIG. 2(A) a typical coded sequence using chirped frequencies for DAS interrogation.

To further describe aspects of our inventive disclosure, we use a coded DAS system which uses chirped code sequence as an example. The real and imaginary waveform of the chirp sequence is shown in FIG. 2(A). The length of the sequence is 127 chip, with any remainder of the interrogation frame filled with zeros.

Figure 2B:
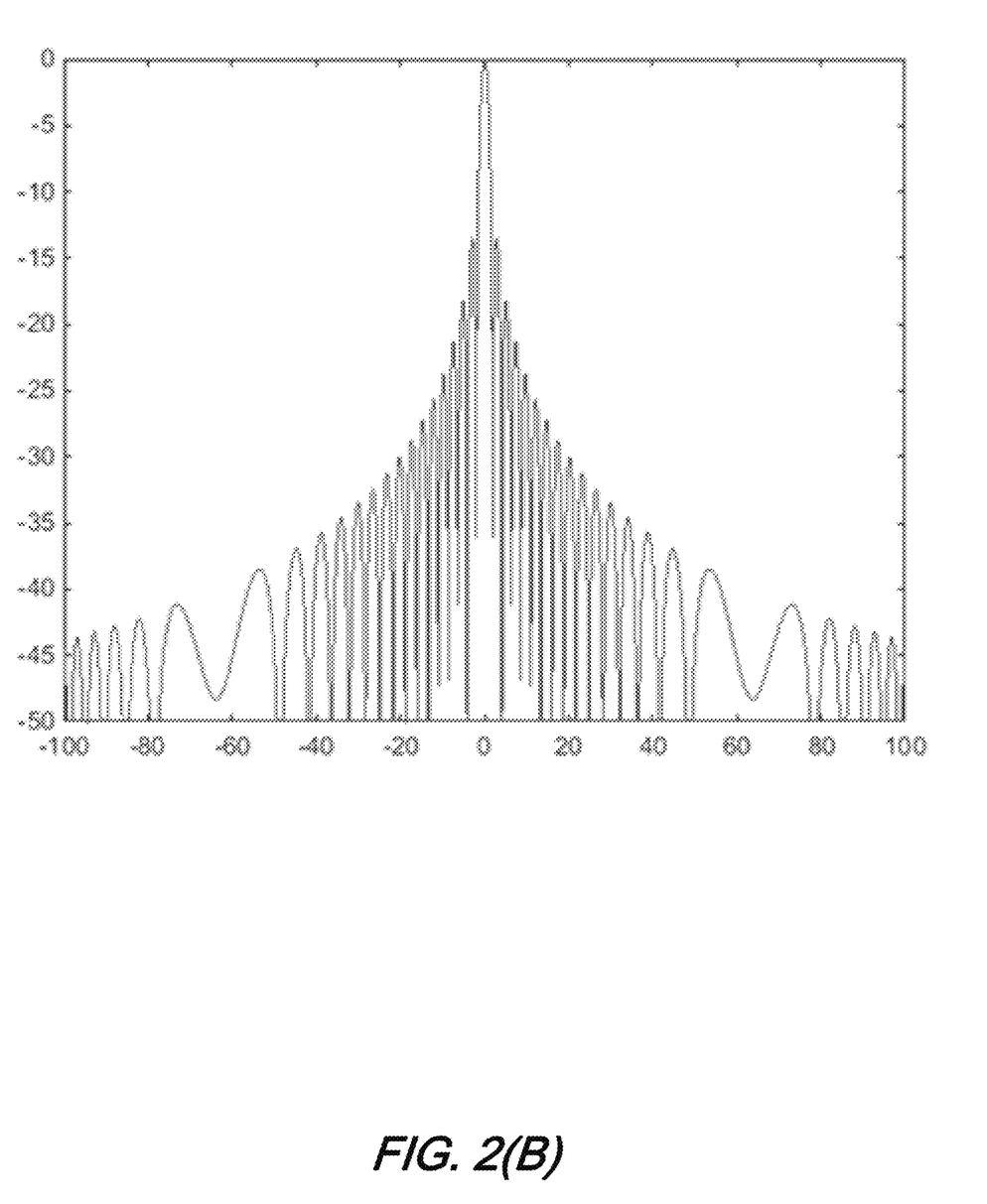
FIG. 2(B) a corresponding autocorrelation function in logarithm scale according to aspects of the present disclosure.
Figure 3A:
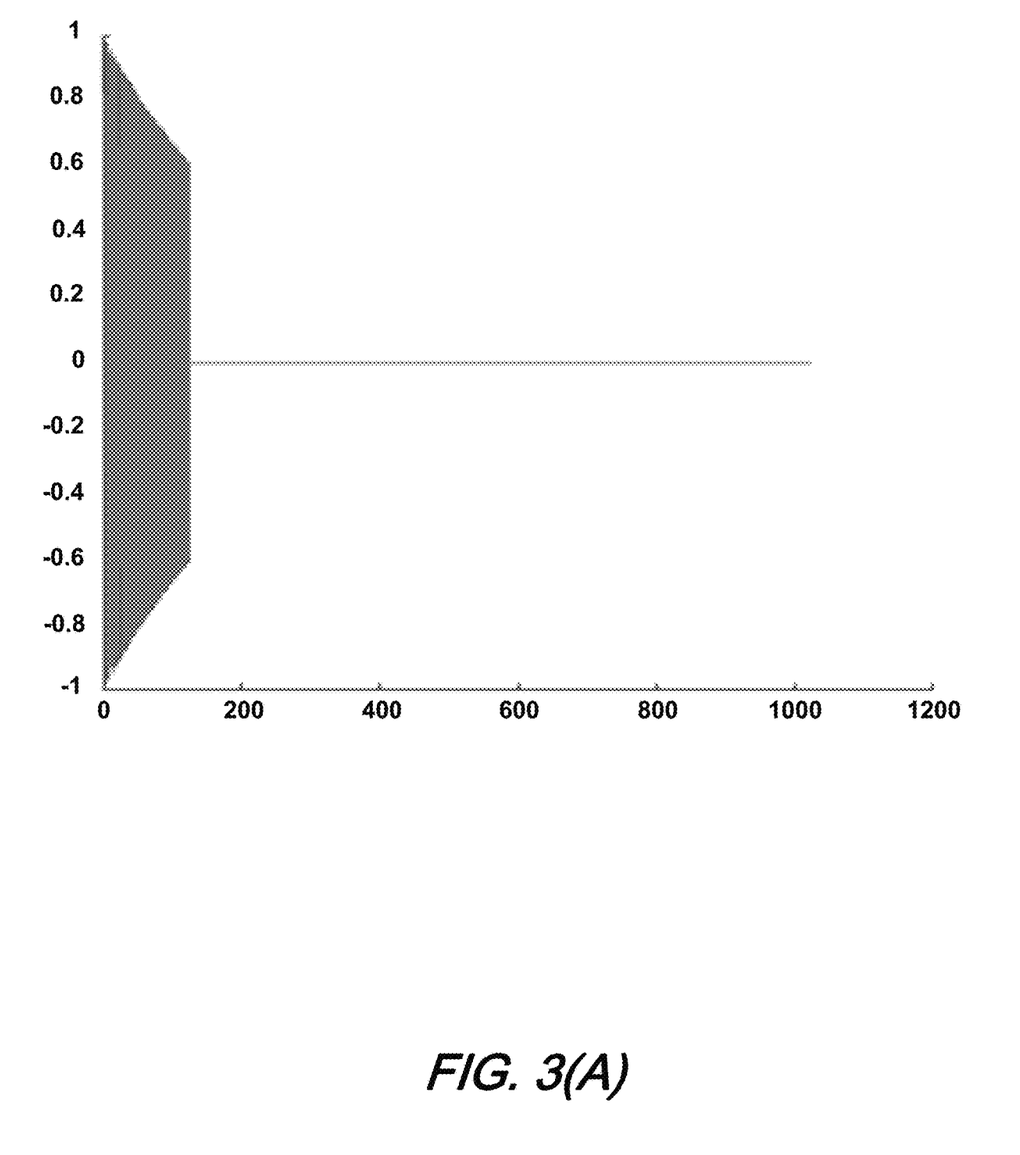
Figure 3B:
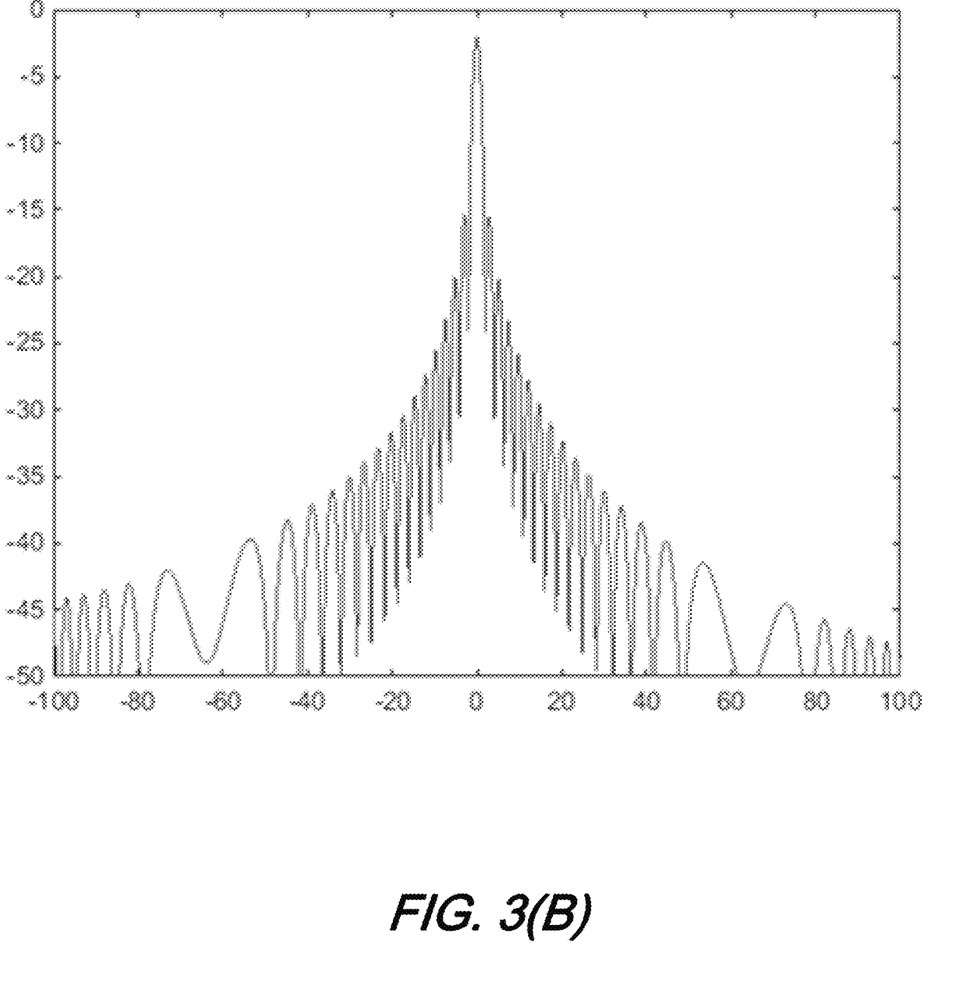
FIG. 3(B) a corresponding autocorrelation function in logarithm scale according to aspects of the present disclosure.

The autocorrelation function of the sequence is shown in FIG. 2(B), with the response falling quickly below −15 dB after the first side lobe. The autocorrelation property of code allows the DAS interrogator to send a long sequence, with more optical power, into the fiber to achieve better SNR, while maintaining the spatial resolution (~2 chip) of distributive sensing after decoding One challenge in using a long sequence for DFOS system is the amplification of the optical interrogation sequence and the returned sensing signal and it. Optical amplifiers such as EDFA and SOA has gain dynamics which correspond to the carrier recovery time, this will create uneven gain response across the code sequence, because the input signal to the amplifier has uneven power distribution in time. This phenomenon is illustrated in FIG. 3(A), as the initial part of the code sequence traverses the EDFA, the carriers start to deplete and the latter part(s) of the sequence receive less and less gain. This gain dynamic will distort the code sequence, and, as a result, the corresponding autocorrelation function, shown in FIG. 3(B), will be impacted. Compared to FIG. 2(B), the ratio of the autocorrelation peak to the side interference has reduced, thus the DAS performance after decoding will suffer as a result. The gain dynamic issue will also affect the DFOS system via optical amplifiers used in the fiber links as well as the receiver amplifiers since the returned sensing signal also exhibit uneven power profile over time.

Yet another problem is when a DFOS system is integrated with existing communication systems/signals in a same/common optical fiber. We note that this problem is not limited to DFOS with coding—in fact by using a coding DFOS system we can reduce the operation signal power which can help with this issue. The main problem is due primarily to a large fiber nonlinearity cross-talk that occurs due to the large power fluctuation(s) of the DFOS interrogation signal(s). The large power fluctuation is clearly observed in our example of chirped code sequence shown in FIG. 2(A), as the rising and falling edges of the sequence has large optical amplitude swings. These instances will create nonlinear cross-talks to neighboring communication channels due to XPM, if the sensing signal is integrated via WDM.

Figure 4A:
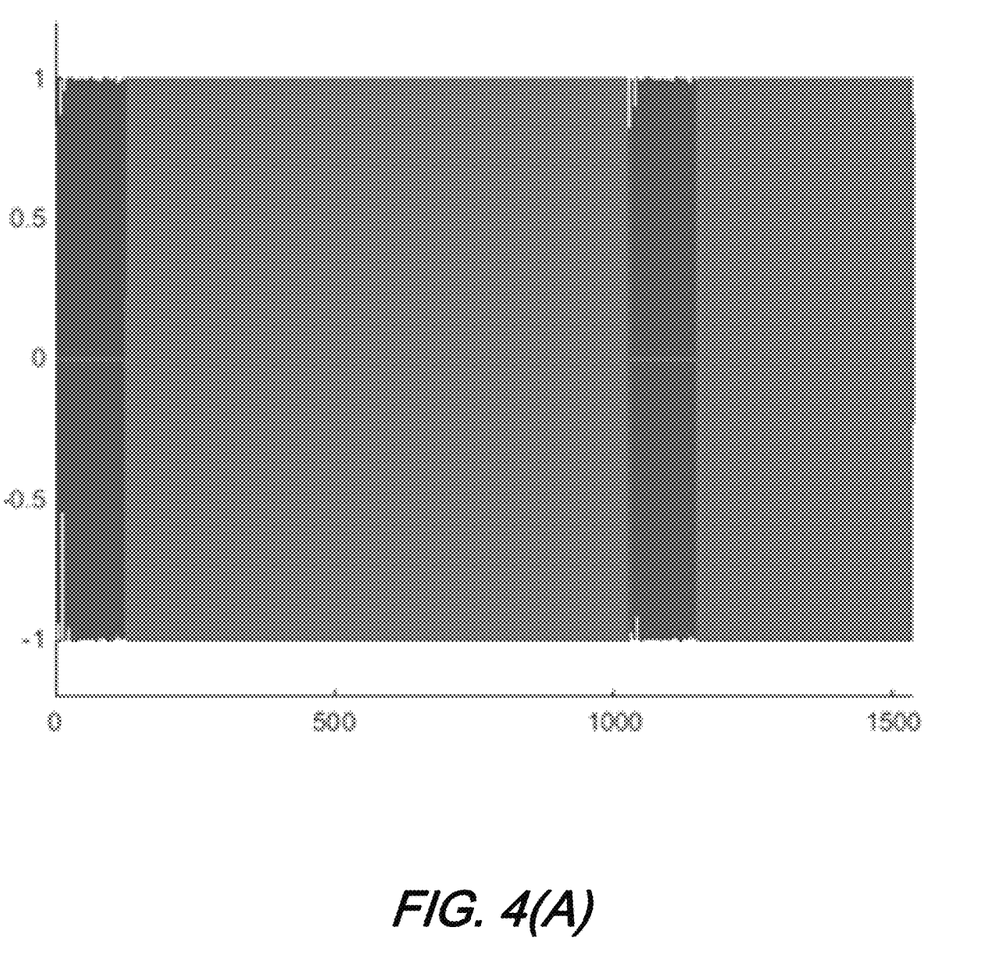
Figure 4B:
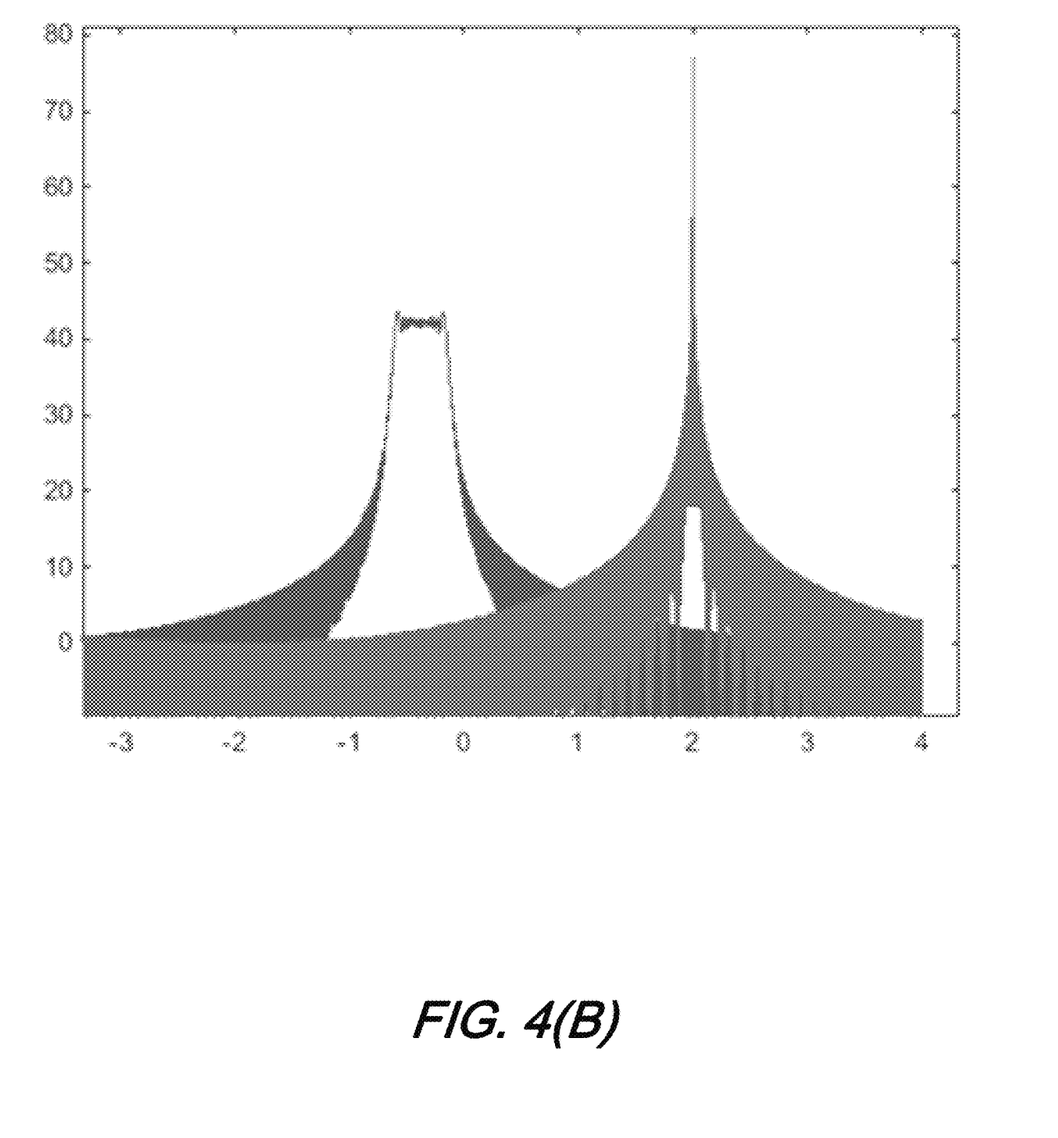

Advantageously, systems, methods, and structures according to our inventive disclosure specifically solve these two main issues by creating an out-of-band signal which is amplified and transmitted together with a main code sequence. One of such example is shown in FIG. 4(A), where a single frequency tone is used as the out-of-band signal. The single frequency waveform is added outside of the time occupied by the code sequence with equal amplitude so that the combined signal will achieve constant amplitude. (Note that only the real part of the signal is shown.) The tone frequency is deliberately selected to be outside of the code sequence operation frequency band, as shown in FIG. 4(B). Therefore, the out-of-band signal can be easily removed by filtering before decoding process at the DFOS receiver DSP.

With the added out-of-band signal, the interrogation signal and the returned sensing signal will have constant amplitude distributed across time. In this case, the optical amplification process reaches an equilibrium in the amplifier dynamics and the gain response distortion is substantially eliminated. Advantageously, the large power fluctuations from the original code sequence are also removed. Therefore, the resulting interrogation signal waveform will have exhibit a much reduced XPM nonlinear crosstalk with neighboring communication channels if they are integrated in the same fiber.

We not note that according to aspects of the present disclosure, there are several ways to create and combine the out-of-band signal. A most convenient way is shown in the example illustrated in FIG. 1, that both the main code sequence and the out-of-band signal is created and combined digitally before waveform generation by DAC. As those skilled in the art will readily appreciate, this reduces the number of hardware components, however the sampling speed and bandwidth of the DAC may need to be higher due to the expanded frequency band generation.

Another way to is to generate the electrical waveforms for the code sequence and out-of-band separately and combine them before optical modulation by electrical power combiners. In this case the out-of-band signal can be generated via an RF frequency source or function generators. This method is more complex as the two signal generators need to be synchronized in time and the signal amplitudes adjusted separately to achieve the constant amplitude in the combined signal.

Yet another way is to combine the code-sequence and out-of-band signal optically after generating the optical signals separately. One such example is that the out-of-band signal can be created via acoustic-optic modulator (AOM) where the intrinsic modulator frequency shift can be used to move the laser frequency out of the band. Like the previous case, the two signal generators need to be synchronized and their amplitude tuned to achieve constant amplitude.

For decoding operation in the DFOS, the out-of-band signal needs to be removed from the returned sensing signal. This can be done simply by filtering in optical, electrical, and digital domain. A cost-effective way is electrical low-pass filtering, as shown in FIG. 1 before the ADC. Compared to implementing digital filtering for the added out-of-band signal, it allows the use of lower sampling rate/bandwidth for the ADC, as well as reduce DSP resources required for filtering processes. Optical filters, having wide bandwidths, are likely not suitable for this process, however if the out-of-band signal is located far away from the main code sequence (>10 GHz), then such method can likely be used.

Figure 5A:
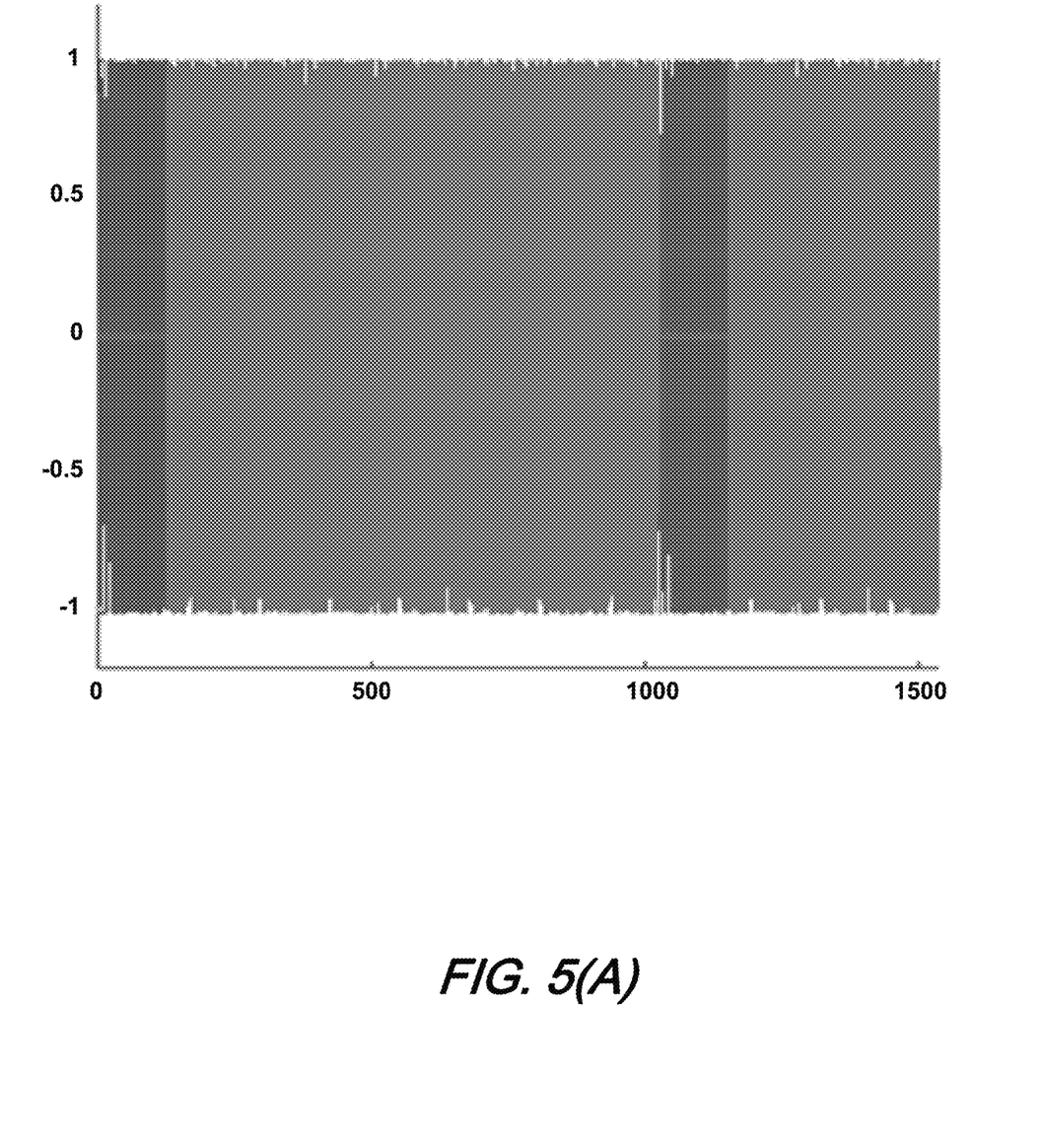
Figure 5B:
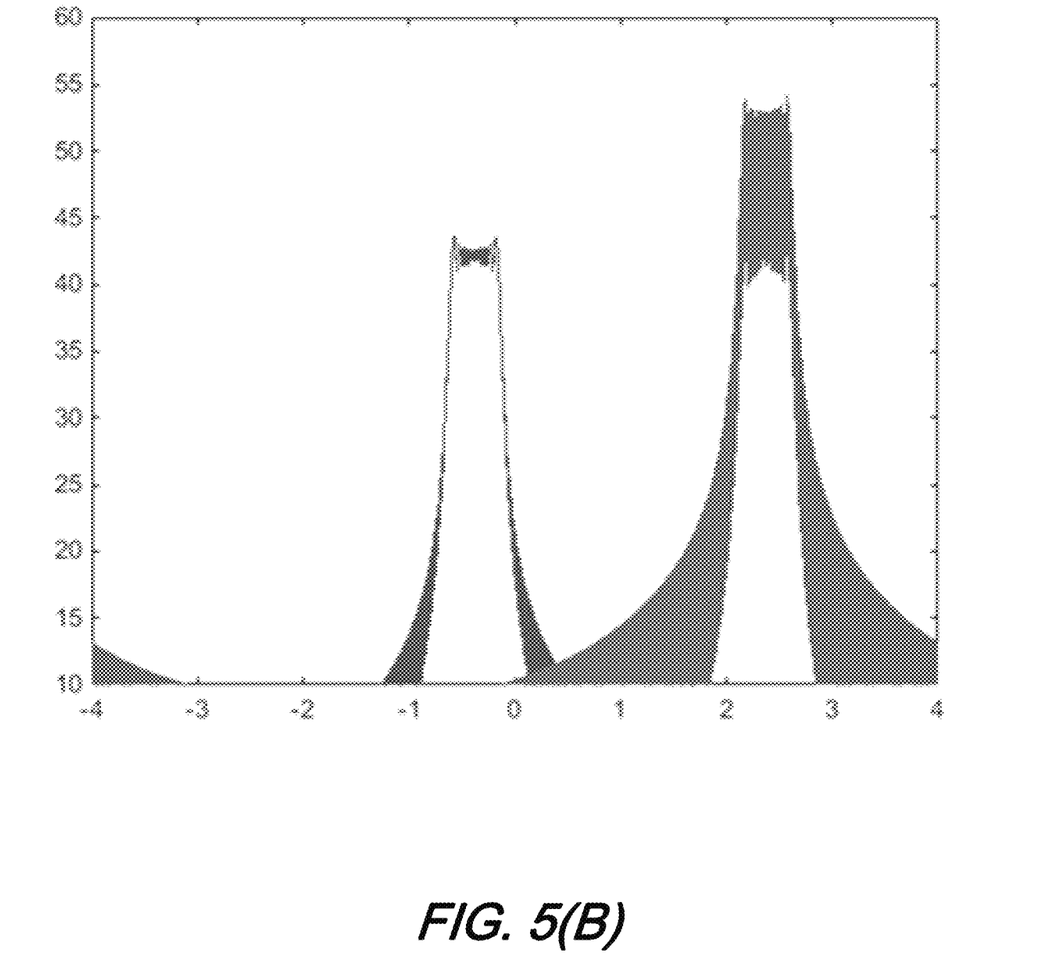

One should note that systems, methods, and structures according to aspects of the present disclosure do not specifically limit the out-of-band signal waveform to a single frequency tone. In FIG. 5(A), we illustrate an example of using chirped waveform as the out-of-band signal. The out-of-band waveform is a frequency shifted version of the original code sequence. The out-of-band waveform is repeated multiple times outside of the time occupied by the code sequence. As the original chirped sequence and the frequency shifted version both have constant amplitudes, the combined signal will achieve constant amplitude as well. (Note that only the real part of the signal is shown.) The frequency-shifted out-of-band chirped signal is separated from the original code sequence, shown in FIG. 5(B). Othere of out-of-band waveforms which exhibit constant amplitude property are M-ary phase-shift-keying (mPSK) signals, which can also be adopted as out-of-band signal for coded DFOS system.

As we have noted previously, a problem with the original constant amplitude using OOB method was the large, reflected power of the OOB signal at long fiber distances and when there are high reflection points along the fiber. Due to practical implementation, OOB cannot be turned off, as continuous modulation input is needed for stable operation of automatic bias control (ABC) of the optical modulator.

According to aspects of the present disclosure, we describe a suppressed OOB modulation method and system in which the OOB amplitude is reduced as compared to the coded sequence, thereby mitigating the receiver saturation issue cause by high reflected power.

With less saturation, the interrogated signal by the coded sequence exhibits more gain at the receiver while the OOB signal is properly filtered out before the decoding operation of the in-band signal.

As noted, by suppressing the OOB signal amplitude the ABC operation of the optical modulator can be stabilized. As ABC requires the detection of the applied bias dither signal, constant modulation input is necessary and in this case is done via the suppressed OOB.

With suppressed OOB, the generated DFOS signal output no longer exhibits a constant amplitude property, thus the code sequence may exhibit a distorted gain profile due to EDFA dynamics. Equalized interrogation amplitude—exclusively for the coded sequence—can be applied using digital pre-equalization, such that a proper decoding of the reflected signal can be maintained without spatial leakage.

Figure 6:
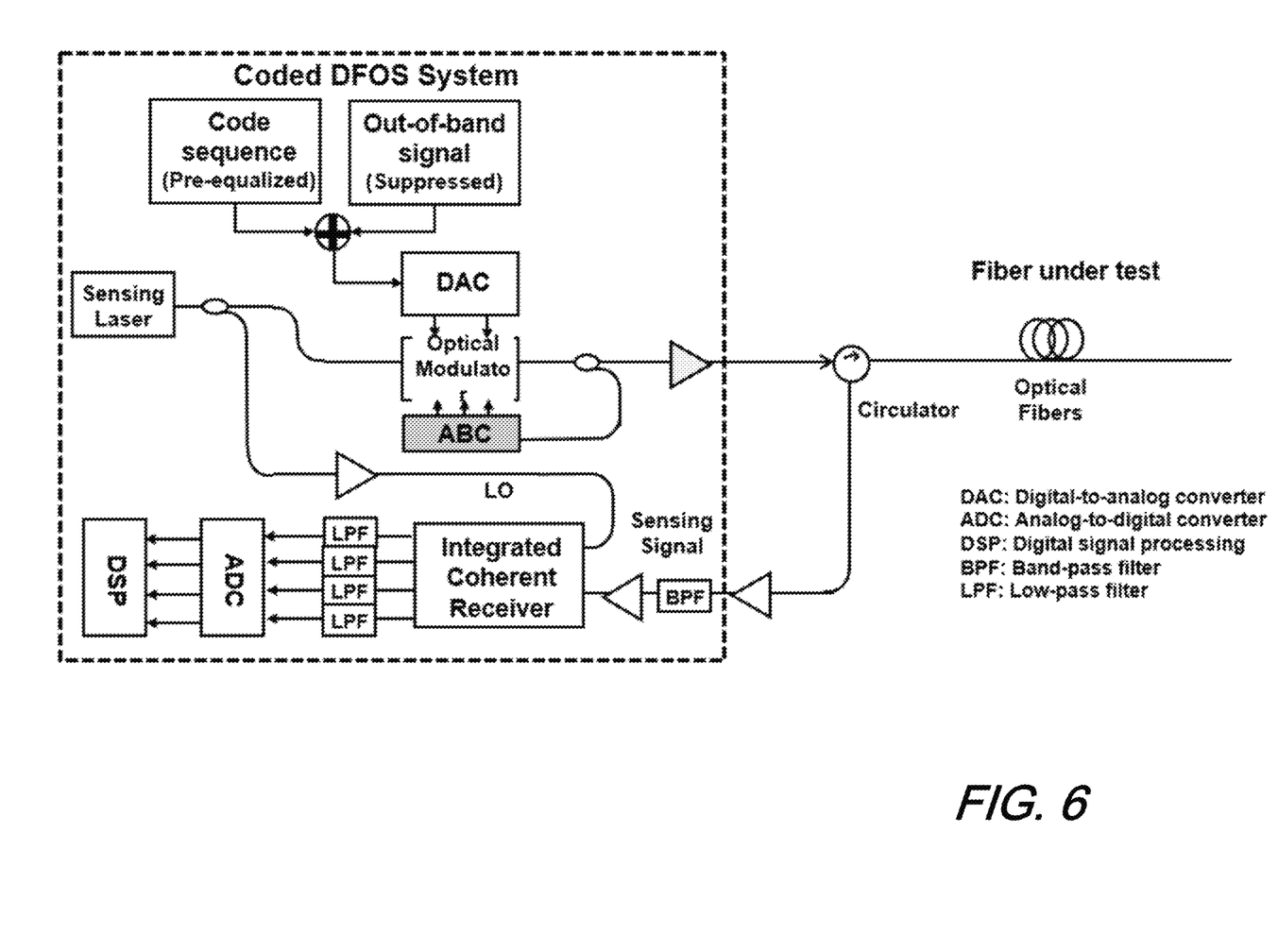
FIG. 6 is a schematic diagram illustrating a coded constant-amplitude DFOS system with suppressed out-of-band signal generation according to aspects of the present disclosure.

FIG. 6 is a schematic diagram showing an illustrative arrangement for a coded DFOS system architecture with suppressed OOB according to aspects of the present disclosure. The areas of particular distinction are shown in a highlighted portion of the diagram.

Operationally, coding is implemented on distributed acoustic sensing (DAS) and Brillouin optical time domain reflectometry (BOTDR) via digitally generated sequence(s), along with an OOB signal before the combined signals are modulated onto the sensing laser via DAC and an optical modulator. We note that problems arise with large fiber losses and high reflection levels in a DFOS-only operation environment. Accordingly, we do not consider the cases for an integrated system with communication channels on the same fiber. Therefore, the scheme disclosed herein does not directly address fiber nonlinearity crosstalk due to XPM and coded sequence distortion caused by carrier response time of multiple link EDFAs, as it only describes a DFOS operation over a single fiber span. Notwithstanding, we specifically note that our inventive disclosure may in fact find applicability in such multi-span configurations.

We note further that in our earlier disclosures, biasing of the optical modulator is done manually to achieve an optimal condition. For product level DFOS implementation, automatic bias control (ABC) is required to adjust for constant temperature changes in an ambient environment. Currently, commercially available ABC modules for the in-phase and quadrature modulator (IQM) (used for coded DAS signal generation) requires continuous modulation of the modulator. As such, even if an OOB signal is no longer required for WDM integration or EDFA gain equalization, the current ABC design still require the presence of OOB to maintain stable biasing.

At this point we note that by employing suppressed OOB, systems according to the present disclosure solve at least two persistent problems. First, it reduces reflected OOB signal strength from the sensing fiber, which is unused for sensing operation, and avoids saturating the interrogator receiver, providing larger gain and therefore dynamic range to the useful portion of the sensing signal. Note further that the presence of the OOB, even at a suppressed level, ensures there is a constant modulation of the IQM that can be biased via ABC. Advantageously, the level of the OOB can be adjusted to achieve an optimal operation point, where the loss margin/sensitivity of the DFOS is the highest while ABC can still main stable bias without drifting.

With OOB signal suppressed, the generated optical interrogation signal is no longer constant amplitude. Thus, the signal can be distorted by the output EDFA of the interrogator. To combat this, a temporal pre-equalization window can be applied to the code sequence during digital generation as indicated in FIG. 6.

The removal of suppressed OOB signal follows the operation of our original design in which the reflected sensing signal is detected and downconverted to baseband using a coherent receiver after amplification and optical band-pass filtering. After reception of the sensing signal, OOB is be removed from the coded signal by electrical, or digital filters. The remaining sensing signal is then decoded via DSP processing to generate the interrogated Rayleigh or Brillouin response of the fiber, and any changes in the response are then identified and interpreted for sensor read-outs.

A real-time coded DAS testbed was used to evaluate the effectiveness of the suppressed OOB approach. The testbed's implementation generally follows the arrangement of FIG. 6. In our testing, we generated sensing signal waveform with its frequency spectrum, when the OOB is the same amplitude as the coded sequence to achieve constant amplitude. Both the coded sequence and the OOB include repeating chirp signals with 40-MHz frequency bandwidth. With 50-us code length and 2-kHz sampling rate, OOB has about 10× higher in signal power higher to the actual coded sequence, as can be observed in the right portion of the signal spectrum. The high power of OOB will limit the loss margin performance of the coded DAS system because of receiver saturation, as the weak reflected signal from end of fiber cannot achieve enough gain.

Using a suppressed OOB level, the power distribution between the coded signal and the OOB can be rebalanced. With 2× reduction in OOB signal amplitude, the power gap is reduced by 6-dB as shown in the signal spectrum. It should be noted that the ABC module in the real-time prototype remains stable operation in the suppressed OOB scheme, as there are no noticeable amplitude drift in the captured optical waveform For single span DFOS interrogation without WDM communication channels, the amplitude level of the OOB can be suppressed to achieve better fiber loss margin performance, as long as stable operation of ABC can be maintained. In FIG. 3(a), we showed an example of the coded DAS waveform output where the OOB level is one fourth of the original level. In this case, the power of OOB is actual 2-dB lower than the coded sequence, meanwhile the ABC still maintains its stable operation. However, since the resulted optical waveform is far from constant amplitude, it is subject to distortion from the transmitter amplifier gain dynamic, as an uneven gain response across the code sequence can be observed. This distortion will impact the sensing performance for the system as the autocorrelation function of the code will deteriorate. A digital pre-equalization scheme can be used to compensate for the EDFA gain distortion.

A fiber loss margin measurement was performed using a 50-km SSMF link with 12.2-dB initial fiber link loss. A tunable optical attenuator with 3-dB insertion loss was applied at mid-link for loss addition. A piezo-electric fiber stretcher was placed at the end of the fiber with 67-Hz 1-Vpp signal applied (~0.8 rad) for DAS sensitivity measurement.

Figure 7:
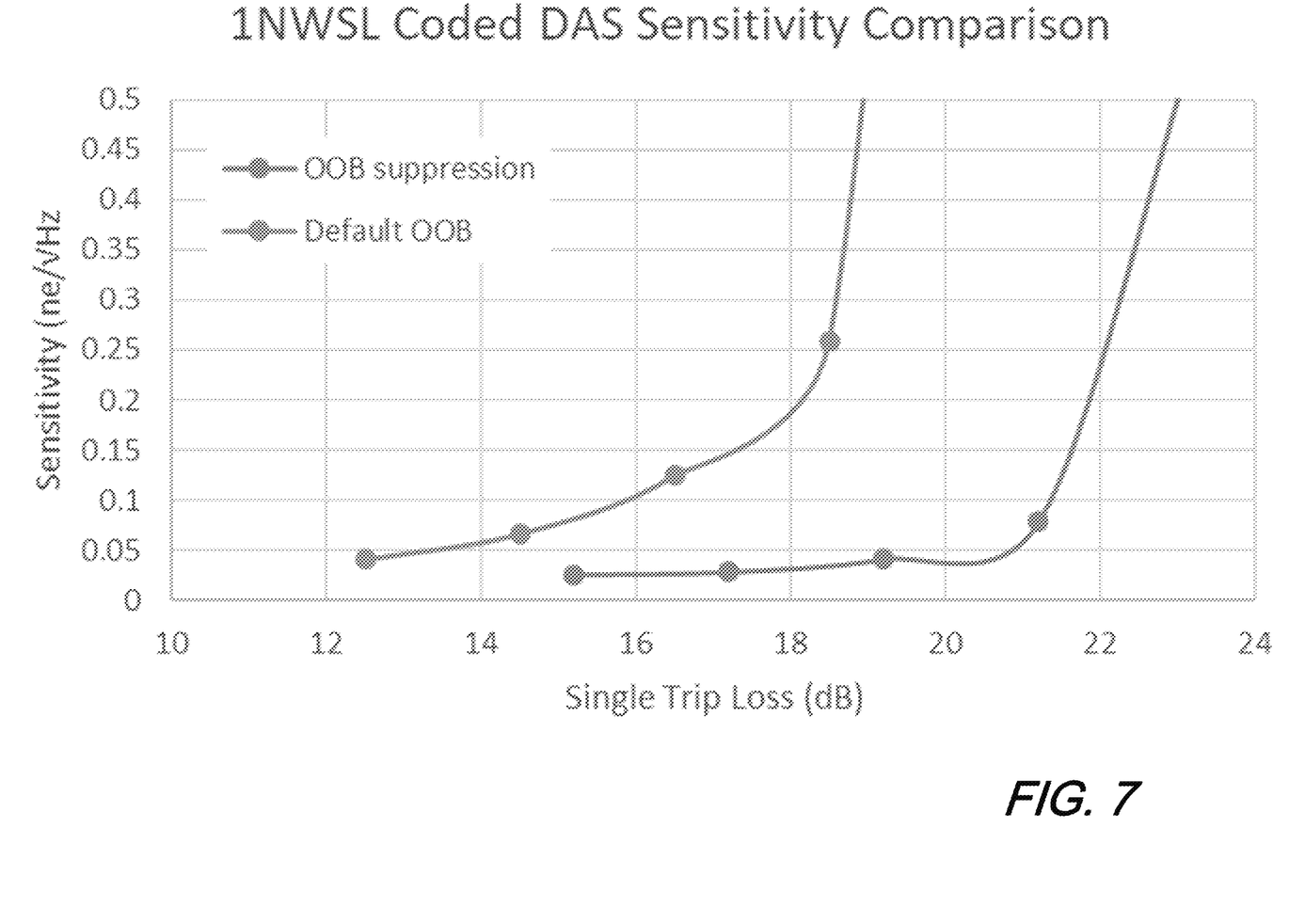
FIG. 7 is a plot showing a comparison of DAS loss margin using OOB with constant and suppressed amplitude (4×) according to aspects of the present disclosure.

The sensitivity of the real-time coded DAS with normal OOB level and suppressed OOB level was plotted against total fiber loss in FIG. 7. The interrogation power is optimized for both settings, where +3-dBm output power was used for normal OOB and +0.6-dBm was used for suppressed OOB. Considering the useful portion of the code sequence, the suppressed OOB setting actually provides 5-dB higher power than the normal setting. As it has less saturation issue at the receiver from OOB, the system can be operated at a higher power level. The benefits are clear, as we have observed an improvement of 4-dB loss margin can be achieved (with cut-off sensitivity of 0.2−ne/Hz^0.5, from 18-dB to 22-dB).

At this point, while we have presented this disclosure using some specific examples, those skilled in the art will recognize that our teachings are not so limited. Accordingly, this disclosure should only be limited by the scope of the claims attached hereto.

The invention claimed is:

1. A coded distributed fiber optic sensing (DFOS) system comprising:
   a length of optical fiber cable;
   a DFOS interrogator system in optical communication with the length of optical fiber cable;
   an intelligent analyzer configured to analyze DFOS sensing data received by the DFOS interrogator system;
   the distributed fiber optic sensing (DFOS) system CHARACTERIZED BY a code sequence generator that generates a coded interrogation sequence; and an out of band signal generator that generates a suppressed out-of-band signal (OOS), said suppressed OOS being combined with the coded interrogation sequence prior to introduction into the optical fiber cable;
   wherein the suppressed OOS is not used by the DFOS system as part of any DFOS sensing data analysis,
   the suppressed OOS is filtered out of any DFOS sensing data prior to its analysis,
   the suppressed OOS is synchronized with the coded interrogation sequence such that the combination of the two signals is a signal exhibiting a constant amplitude waveform, the combined signals are output to the optical fiber cable and using the constant amplitude waveform of the signal an equalized gain for the coded interrogation sequence is produced,
   the DFOS system is integrated in that the optical fiber cable simultaneously conveys non-sensory telecommunications optical signals,
   DFOS interrogation signals and the non-sensory telecommunications optical signals are wavelength-division-multiplexed into the optical fiber cable, and
   the constant amplitude waveform of the DFOS interrogation signals improves any nonlinear cross-talk characteristics with the non-sensory telecommunications optical signals due to reduced cross-phase modulation—as compared with an operation using interrogation signals that did not exhibit the constant amplitude waveform.

2. The system of claim 1 wherein the coded interrogation sequence is pre-equalized prior to combining with the suppressed OOS.

* * * * *